United States Patent
Banavalikar et al.

(10) Patent No.: US 9,038,053 B2
(45) Date of Patent: May 19, 2015

(54) NON-DISRUPTIVE SOFTWARE UPDATES FOR SERVERS PROCESSING NETWORK TRAFFIC

(75) Inventors: Bhalachandra G. Banavalikar, Cupertino, CA (US); Chidambaram Bhagavathiperumal, Santa Clara, CA (US); Keshav Govind Kamble, Fremont, CA (US); Dar-Ren Leu, San Jose, CA (US); James Maples, Palo Alto, CA (US)

(73) Assignee: Lenovo Enterprise Solutions (Singapore) PTE. LTD, New Tech Park (SG)

( * ) Notice: Subject to any disclaimer, the term of this patent is extended or adjusted under 35 U.S.C. 154(b) by 359 days.

(21) Appl. No.: 13/594,966

(22) Filed: Aug. 27, 2012

(65) Prior Publication Data

US 2014/0059529 A1    Feb. 27, 2014

(51) Int. Cl.
*G06F 9/44* (2006.01)
*G06F 9/445* (2006.01)
*G06F 11/36* (2006.01)

(52) U.S. Cl.
CPC .............. *G06F 8/67* (2013.01); *G06F 9/4401* (2013.01); *G06F 11/3668* (2013.01); *G06F 9/4406* (2013.01)

(58) Field of Classification Search
None
See application file for complete search history.

(56) References Cited

U.S. PATENT DOCUMENTS

| 7,430,735 | B1 | 9/2008 | Balakrishnan et al. | |
| 2006/0130042 | A1* | 6/2006 | Dias et al. | 717/168 |
| 2010/0042869 | A1* | 2/2010 | Szabo et al. | 714/4 |

FOREIGN PATENT DOCUMENTS

| CN | 101383724 B | 4/2011 |
| CN | 1992639 B | 8/2011 |

* cited by examiner

*Primary Examiner* — Don Wong
*Assistant Examiner* — Deric Ortiz
(74) *Attorney, Agent, or Firm* — Katherine Brown

(57) ABSTRACT

Updating software on first and second network controller entities (NCEs), without disrupting traffic processing, comprises resetting the second NCE after it receives a proposed software version from the first NCE. The second NCE runs the proposed software version in a standby role. While the second NCE runs the proposed software version in the standby role, databases of the NCEs stay synchronized. Resetting the first NCE induces the second NCE to assume the master role, and the first NCE to assume the standby role. The second NCE in the master role tests the proposed software version for a predetermined period. If validation succeeds, the second NCE instructs the first NCE to reboot and run the proposed software version in the standby role. Otherwise, the second NCE reverts to running the current software version in the standby role; and the first NCE, running the current software version, reverts to the master role.

14 Claims, 8 Drawing Sheets

22

| FROM -> TO | 1.0 | 1.5 | 2.0 | 2.5 | 3.0 |
|---|---|---|---|---|---|
| 1.0 | YES | YES | YES | YES | YES |
| 1.5 | YES | YES | YES | YES | YES |
| 2.0 | NO | NO 73-1 | YES | YES | YES |
| 2.5 | NO | NO | YES 73-2 | YES | YES 73-3 |
| 3.0 | NO | NO | NO | YES | YES |

FIG. 4

NON-DISRUPTIVE SOFTWARE UPDATES FOR SERVERS PROCESSING NETWORK TRAFFIC

FIELD OF THE INVENTION

The invention relates generally to systems for performing non-disruptive software upgrades on network traffic processing servers.

BACKGROUND

Networking systems that demand high availability of controlling entities require extremely precise maneuvering during software upgrades to these systems. Typically, such networking systems are responsible for handling networking connectivity among network entities, and any changes to the software ecosystem controlling these networking systems require that the data path and control path networking connectivity remains intact during these software upgrades. With the exponential growth in the quantity of networking data that such networking systems need to handle, it is critical for there to be almost no downtime during their software image upgrades.

SUMMARY

In one aspect, the invention features a computer program product for updating software on first and second network controller entities (NCEs) without disrupting traffic processed by the first and second NCEs. The computer program product comprises a computer-readable storage medium having computer-readable program code embodied therewith. The computer-readable program code comprises computer-readable program code configured to transmitting a proposed software version, from the first NCE running a current software version in a master role, to the second NCE running the current software version in a standby role. The second NCE is reset after receiving the proposed software version from the first NCE such that the second NCE begins running the proposed software version in the standby role. Databases of the first and second NCEs are synchronized while the second NCE runs the proposed software version in the standby role. The first NCE is reset such that the second NCE runs the proposed software version in the master role and the first NCE assumes the standby role while continuing to run the current software version. The second NCE, in the master role, tests live operation of the proposed software version for a predetermined validation period. If validation is successful, a command is sent from the second NCE to the first NCE, instructing the first NCE to reboot and run the proposed software version in the standby role. Otherwise, if validation is unsuccessful, the second NCE is automatically rebooted such that the second NCE reverts to running the current software version in the standby role and the first NCE reverts to the master role and continues to run the current software version.

In another aspect, the invention features a system comprising a first network controller entity (NCE) running a current software version in a master role and a second NCE in communication with the first NCE over a network, the second NCE running a current software version in a standby role. The first NCE transmits a proposed software version to the second NCE running the current software version in a standby role. The second NCE resets after receiving the proposed software version from the first NCE such that the second NCE begins running the proposed software version in the standby role. The first and second NCEs synchronize databases while the second NCE runs the proposed software version in the standby role. The first NCE resets so that the second NCE runs the proposed software version in master role and the first NCE assumes the standby role while continuing to run the current software version. The second NCE tests, while in the master role, live operation of the proposed software version for a predetermined validation period. If validation is successful, the second NCE sends a command to the first NCE instructing the first NCE to reboot and run the proposed software version in the standby role. Otherwise, if validation is unsuccessful, the second NCE automatically reboots such that the second NCE reverts to running the current software version in the standby role and the first NCE reverts to the master role and continues to run the current software version.

BRIEF DESCRIPTION OF THE DRAWINGS

The above and further advantages of this invention may be better understood by referring to the following description in conjunction with the accompanying drawings, in which like numerals indicate like structural entities and features in various figures. The drawings are not necessarily to scale, emphasis instead being placed upon illustrating the principles of the invention.

FIG. 4 is a grid form of an embodiment of a compatibility matrix used to cross-references versions of software to determine compatibility between versions.

DETAILED DESCRIPTION

Figure 1:
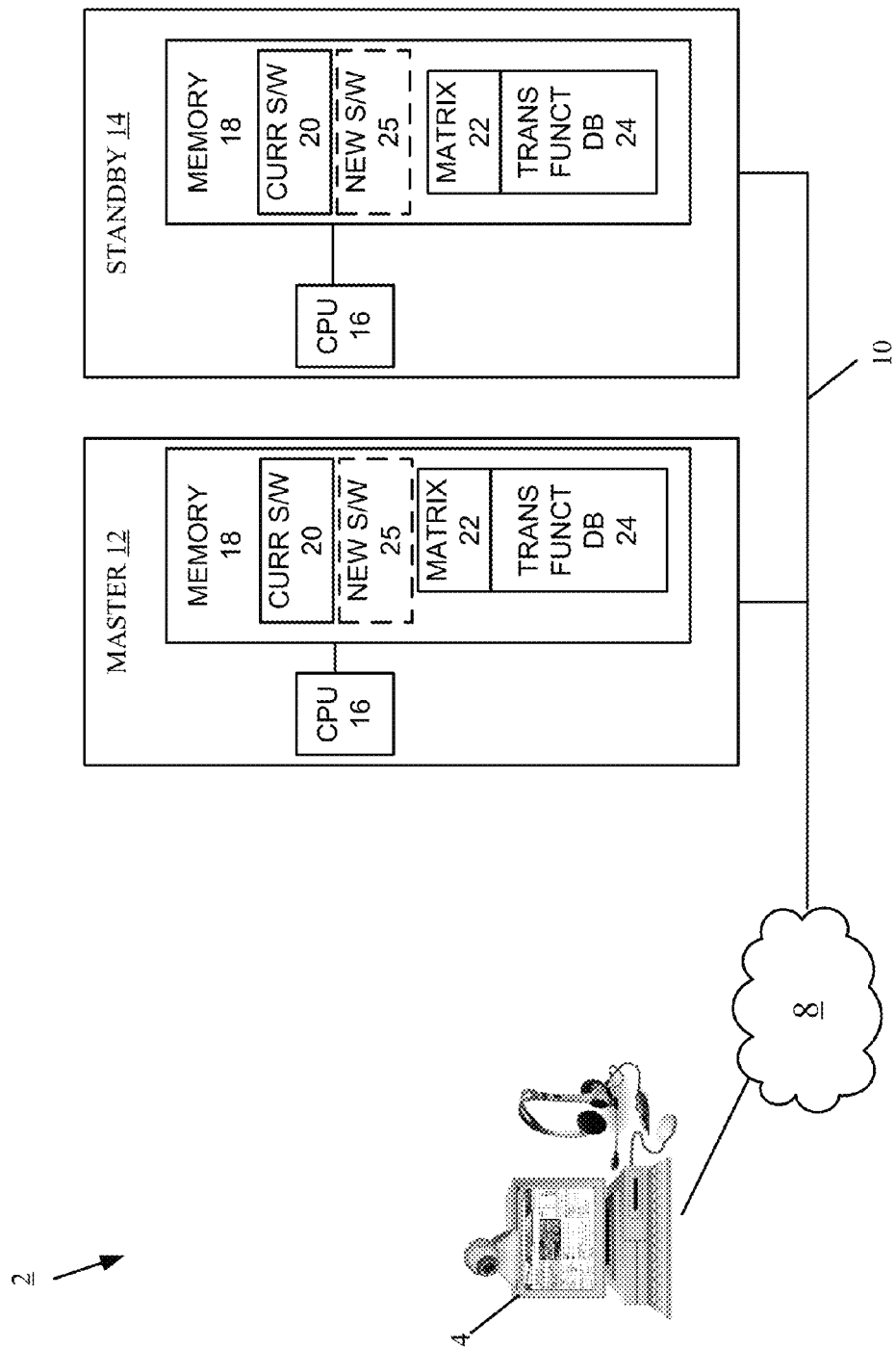
FIG. 1 is a diagram of an embodiment of a system for updating software on network controller entities (NCEs) without disrupting the traffic processed by the NCEs.

Networking systems, described herein, implement procedures that perform upgrades and downgrades of software, guarantee the compatibility of software ecosystem before and after the update procedure, allow uninterrupted networking connectivity during the software update, provide a technique for the transparent conversion between old and new software databases, and ensure the manageability of the system throughout the duration of the update.

A non-disruptive software update (NDSU) procedure, as referred to herein, involves administering coordinated set of controlled actions to ensure that the new software image gets loaded and validated before a master and standby network controller entities (NCEs) commit to its use. In one embodiment, the master and standby NCEs coordinate the NDSU process. In brief overview, the master NCE accepts an NDSU command and receives a new software image from a management station. The master NCE performs a compatibility check to ensure that the NDSU operation can be supported from the currently running software version to the newly received proposed software version. If the newly received proposed software version is accepted for the NDSU, the master NCE transmits the proposed software image to the standby NCE. The standby NCE validates the newly received proposed software version for functional usefulness and operational completeness by behaving as the master NCE for predefined period. If the validation succeeds and the administrator approves the runtime behavior of the newly installed software image, then the standby NCE (now acting in the master role) approves the new software image as a new baseline for further operation. If the proposed software image does not pass validation, the standby NCE (currently acting as the master NCE) rolls back to the previous software image.

During both NDSU upgrade and downgrade operations, the master and standby NCEs may momentarily be running dissimilar images. For example, the master NCE may be running the new software image, while the standby NCE runs the older software image. In these instances, the NDSU process requires that those messaging data structures being exchanged between the two systems are converted from older to newer software versions or vice versa. These data conversions are done automatically as part of the NDSU process.

During NDSU, an administrator at the management station has visibility into the progress of the operation. Additionally, the administrator has supervisory control through the management interfaces to abort the NDSU process at any point, if so desired, before the commit stage of the NDSU process.

In another embodiment, the NDSU process allows targeted updates of specific components of the currently running software image. This targeted update feature allows the patching of specific components for bug fixes or for feature enhancement, without affecting the performance of other processes running on the NCEs. In another embodiment, the NDSU process provides concurrent upgrade of multiple software images for, for example, a networking fabric, software, and server applications.

FIG. 1 shows an embodiment of a networking system 2 including a management station 4 in communication over a network 8 with a first network controller entity 12 and a second network controller entity 14. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN.

In general, network controller entities play a crucial role in controlling the operational behavior of the network entities on the network and for maintaining a healthy network. Preferably, the NCEs 12, 14 are independent, standalone packet-based switches deployable at a single site or distributed among multiple sites. Their physical separation, connected by a communication link 10, presents a risk to non-disruptive updates (e.g., because of link failure, lost packets, etc.). Embodiments of the switches 12, 14 include, but are not limited to, core switches, access switches, fabric cards, line cards, and management modules in a physical chassis switch.

The NCEs 12, 14 are configured together within to cooperate as a single distributed fabric system, as a virtual switch, or as a stacked switch. In general, a defined group of standalone packet-based switches has a master controller switch, one or more standby or back-up controller switches, and one or more follower switches. One of the NCEs of the group is chosen as the master controller switch, another is designated as the standby, and all other switches are followers. The master controller switch is, in general, the control center for the group of packet-based switches, and a follower switch is any network entity under the control of the master switch. Under normal operation of the group, the standby switch operates like a follower switch, except that the backup switch assumes master ownership should the current master controller switch fail. As master, the master switch sends management, control, and/or data plane packets to and receives responses from follower switches. While processing traffic in the master role, the master switch may encounter events that require database updates and database synchronization with the standby switch. Examples of databases that may require updates and synchronization include, but are not limited to, network configuration parameters, run-time statistics, logs, and timestamps. For purposes of illustrating a NDSU process, the NCE 12 is initially referred to as the master NCE 12, and the NCE 14 is initially referred to as the standby NCE 14.

Each of the master and standby NCEs 12, 14 includes a processor or CPU 16 in communication with memory 18. Stored in the memory 18 are a current software version (program code) 20, which determines the operational behavior of the NCEs, including their traffic handling functionality, a software compatibility matrix 22, and a translation database 24. A portion of the memory 18 is used to store a proposed software version 25 during the NDSU process. Example implementations of the memory 18 include, but are not limited to, FLASH, EEPROM, EPROM, and ROM.

The compatibility matrix 22 includes a data structure that holds information indicating whether any two versions of operational software (e.g., current software 20 and proposed software 25) are compatible with each other. Each revision of the operational software generally uses different data structures; for example, new revisions can expand upon the data structures of or add new attributes to a previous revision. The translation database 24 stores translation functions for converting between compatible versions of software.

The management station 4 provides a centralized point of administration for managing and controlling the NCEs 12, 14. Through the management station 4, a network administrator communicates with the master NCE 12 in order to manage the group. A graphical user interface (GUI) application executing on the management station 4 can serve to provide the network administrator with a view of the entire network topology of the different switches. An example of such a GUI application is Blade Harmony Manager® provided by IBM Corporation of Armonk, N.Y.

In addition, the management station 4 can connect directly (point-to-point) or indirectly to one of the NCEs 12, 14, over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station 4 can access a command-line interface of a given switch 12, 14.

Figure 2:
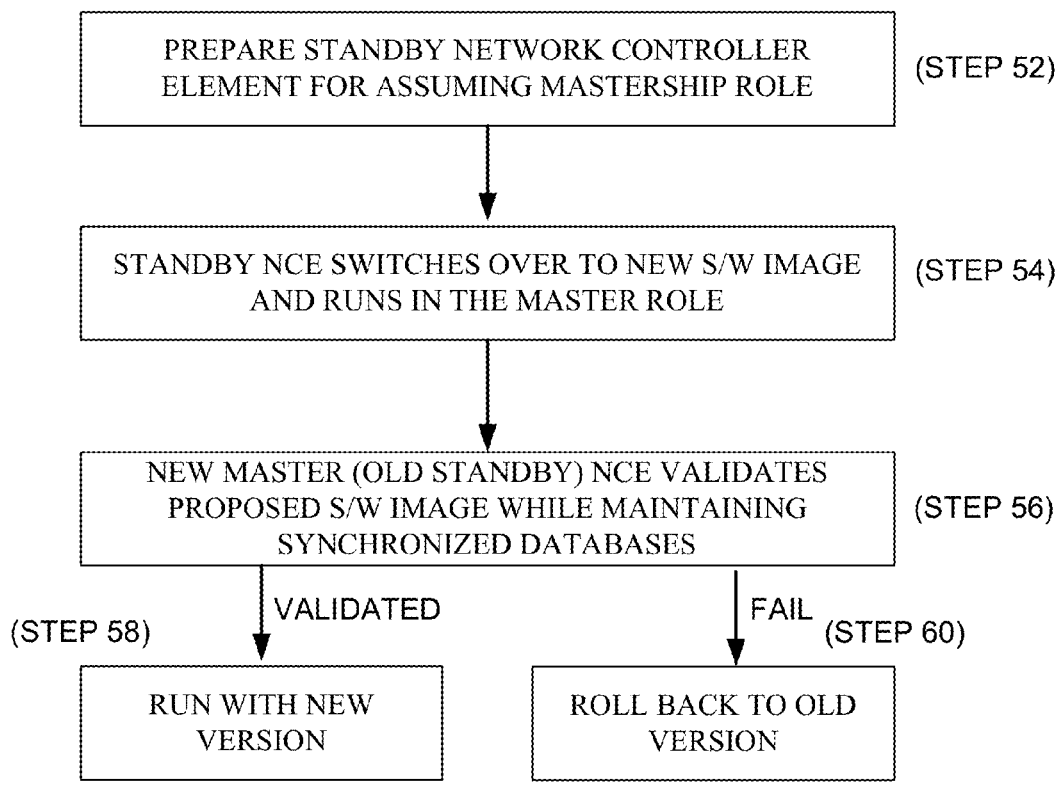
FIG. 2 is a flow chart of an embodiment of a process for performing a non-disruptive software update involving the master and standby NCEs.

FIG. 2 shows an embodiment of a process 50 for performing a non-disruptive software update involving the master and standby NCEs 12, 14. At step 52, the standby NCE 14 prepares for assuming mastership role. The standby NCE 14 switches over (step 54) to the proposed software version 25 and assumes the mastership role. While maintaining a synchronized database with the old master NCE 12, the standby NCE 14, in its acquired role of the new master NCE 14, runs (step 56) the proposed software version 25 in order to validate it. If validation succeeds (step 58), the old master NCE 12 and new master NCE 14 run the proposed software version 25; the master NCE 12 runs the proposed software version 25 in the standby role, whereas the standby NCE 14 continues to run the proposed software version 25 in the mastership role. If validation fails (step 60), the new master NCE 14 rolls back to the previous software version 20 automatically and reverts to the standby role; the old master NCE 12 returns to the mastership role and continues to run the previous software version 20.

Figure 3:
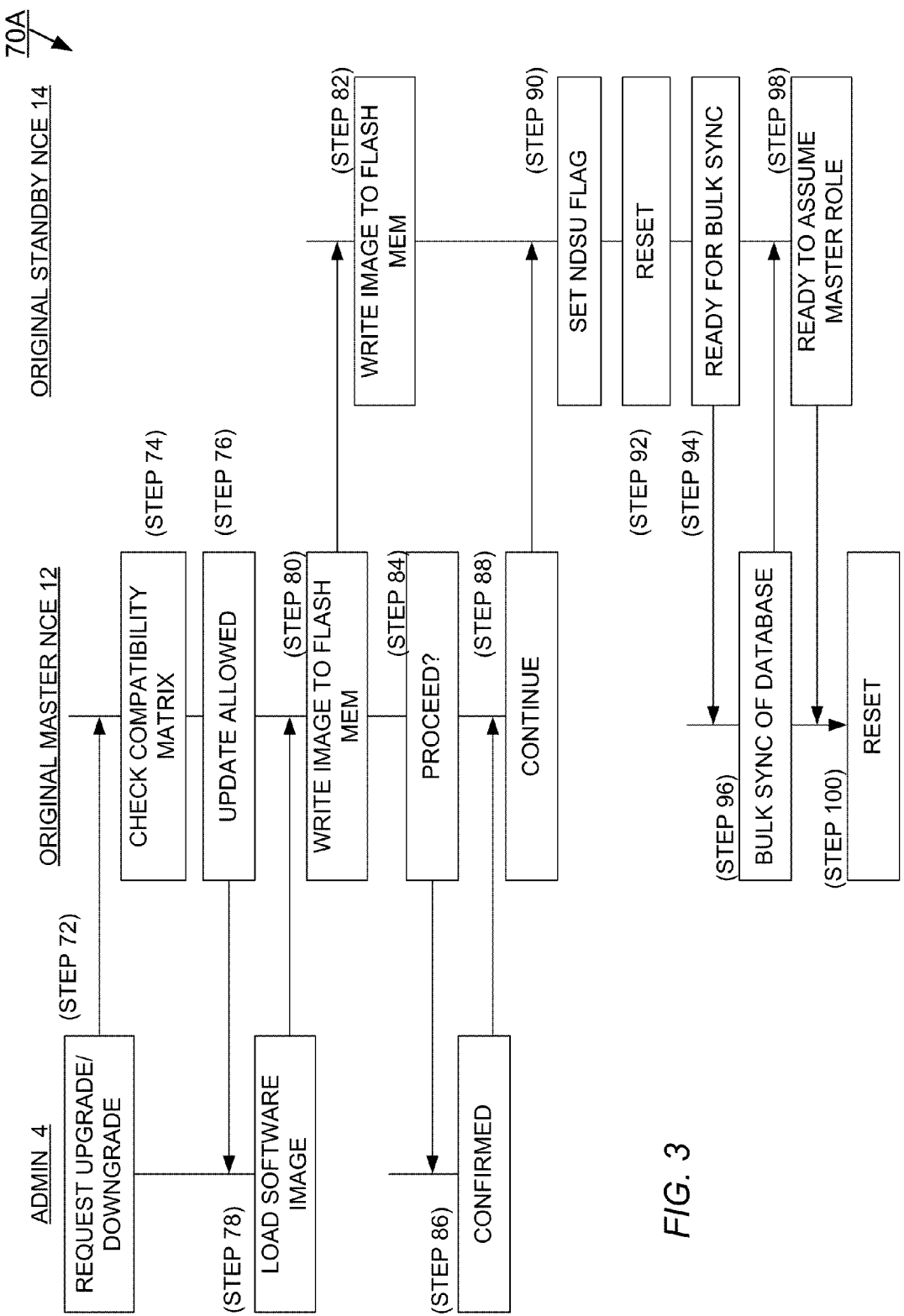
FIG. 3 is a flow chart of an embodiment of a process for preparing the standby NCE to assume the mastership role.

FIG. 3 shows an embodiment of a process 70A for preparing the standby NCE 14 to assume the mastership role. In the description of the process 70A, reference is also made to the elements of FIG. 1. At step 72, the administrator (from the maintenance station 4) initiates a request to perform a software upgrade or downgrade, sending the request to the master NCE 12. In response to the request, the master NCE 12 refers (step 74) to the compatibility matrix 22, determining from the matrix 22 whether the proposed software release is compatible with the existing (current) software image.

FIG. 4 shows an embodiment of the compatibility matrix 22, which cross-references versions of software. In this embodiment, the set of software versions from which to upgrade or downgrade appears as columns in the matrix 22, whereas the set of software versions to which to upgrade or downgrade appears as rows in the matrix 22. As an example, if the request from the administrator is to upgrade from software version 1.5 to version 2.0, the result 73-1 of the compatibility check is incompatible (i.e., NO). If the request from the administrator is to upgrade from software version 2.0 to version 2.5, the result 73-2 of the compatibility check is compatible (i.e., YES). As another example, the administrator can request a downgrade from software version 3.0 to software version 2.5, the result 73-3 of the compatibility check is that the software versions are compatible (i.e., YES), and the downgrade is permissible.

Returning to FIG. 3, at step 76, the master NCE 12 allows or denies the version change in response to the compatibility check, sending the result to the administrator 4. In the instance of an incompatibility, the administrator can choose to proceed with a "forced" upgrade or downgrade. Such a "forced" update is generally not hitless (i.e., it disrupts data traffic) because it does not follow the NDSU requirements described herein. Accordingly, planned downtimes of the network accompany forced upgrades/downgrades.

When the update is allowed, the administrator 4 downloads (step 78) the proposed software version to the master NCE 12 with a request to load it. The master NCE 12 authenticates and writes (step 80) the proposed software version to the memory 18. The master NCE also writes (step 82) the proposed software image to its memory 18 of the standby NCE 14.

At this stage, the administrator has an opportunity to terminate the NDSU process. At step 84, the master NCE 12 seeks confirmation from the administrator about whether to proceed with the upgrade or downgrade. After the administrator confirms (step 86) the intent to continue the process, the master NCE 12 likewise signals (step 88) the standby NCE 14. In response to the signal to continue, the standby NCE 14 sets (step 90) a special flag to indicate that a software update is in progress. The standby NCE 14 then reboots (step 92) itself. During reboot, the standby NCE 14 accesses this flag, which directs the standby NCE 14 to the proposed software version 25 stored in its memory 18. Accordingly, the standby NCE 14 comes up running the proposed software image in the standby role.

The standby NCE 14 conveys (step 94) its readiness to receive bulk sync updates from the master NCE 12. In general, a "bulk sync" is a type of sync operation between the master and standby NCEs, whereby the entire database is synchronized at the standby NCE as part of the preparation of the standby NCE to become a "hot" standby NCE. Another type of sync is an incremental sync, wherein a portion of the database that changes on the master NCE is synchronized with the standby NCE. Bulk sync typically occurs during a switchover of roles between master and standby NCEs, whereas incremental syncs are ongoing runtime activities. The sync operation can involve, for example, network configuration parameters, timestamps, or any data that ensures that the exchange of roles between the master and standby NCEs is transparent to any external entities interacting with the NCEs. Following that, the master NCE 12 pushes (step 96) a bulk synchronization of the database to the standby NCE 14 in order to prepare it to take over as Master NCE. After the bulk sync is complete, the standby NCE 12 notifies (step 98) the master NCE 12 of its readiness to assume the role of the master NCE 14. In response to this notice, the master NCE 12 resets (step 100) itself. Preferably, a reset is a soft reset (no loss of power), with the NCE changing to booting from a new software image based on the status of a boot flag programmed in the memory 18. This reset operates to cause the master NCE 12 to relinquish the role of master.

Figure 5A:
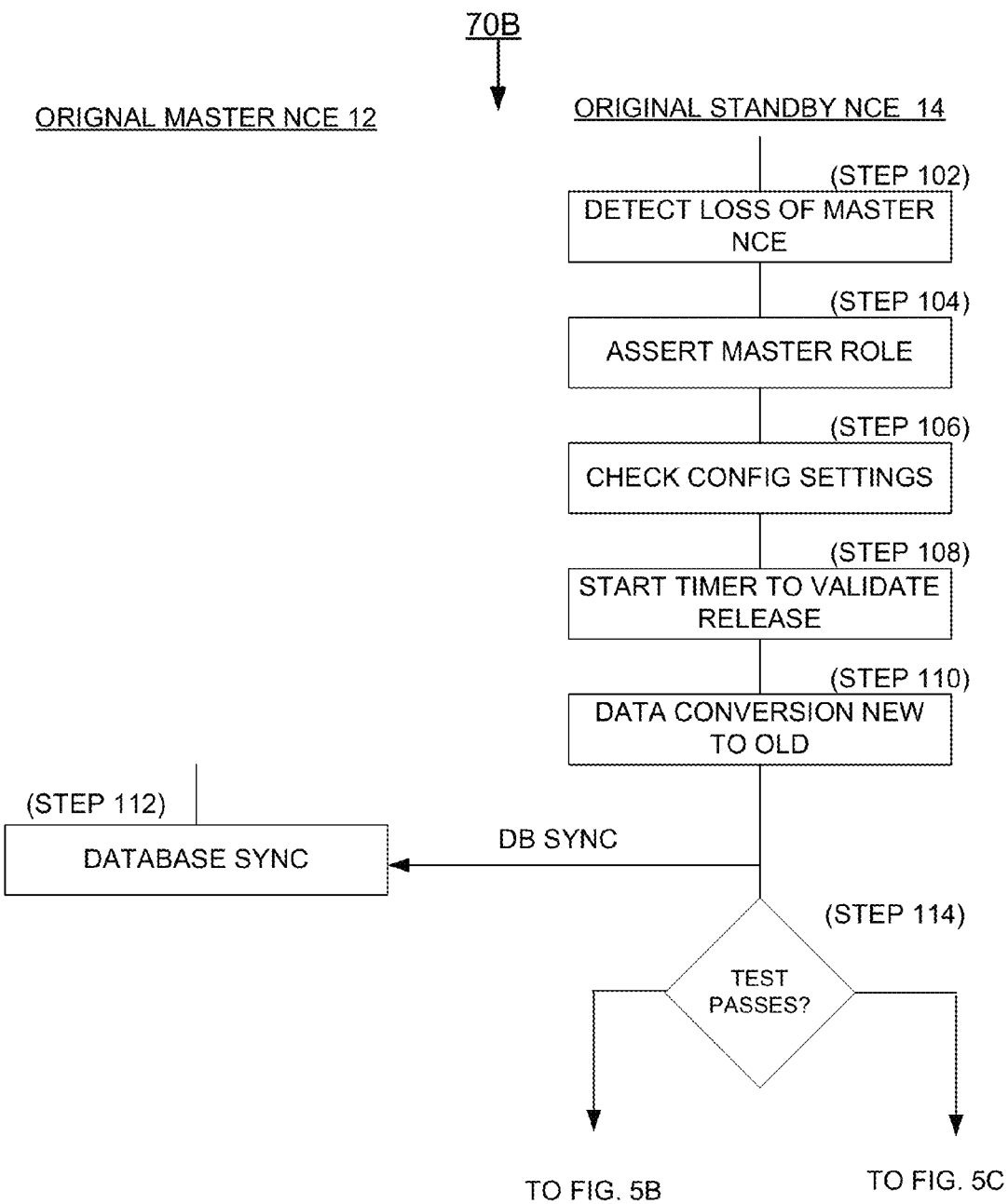
FIG. 5A is a flow chart of an embodiment of a process by which the standby NCE switches over to running the proposed software and assumes mastership role.

FIG. 5A shows an embodiment of a process 70B by which the standby NCE 14 switches over to running the proposed software version 25 and assumes the mastership role. The process 70B continues from the where the process 70A leaves off. At step 102, the standby NCE 14 detects the loss of the master NCE 12 resulting from the rebooting of the master NCE 12. In response, the standby NCE 14 asserts (step 104) the master role. The old master NCE 12, as it reboots, senses the presence of a master NCE (i.e., new master/old standby NCE 14) and, in response, becomes a new standby NCE running the previous software version 20. The new master/old standby NCE 14 checks (step 106) configuration settings to determine that this is an NDSU process and starts (step 108) a timer. This health check timer is one of the configuration settings; the duration of the timer is long enough to validate basic run-time functionality of the proposed software version 25. The new master NCE 14 runs the proposed software version 25 during this validation period. Expiry of the health check timer without any detected problems (or with errors below a predetermined threshold) validates the proposed software version 25.

At this stage in the process 70B, the new master/old standby NCE 14 controls the group behavior. When an event occurs that requires database synchronization with the new standby/old master NCE 12, the new master/old standby NCE 14 searches through a translation function database 24 residing within its memory 18 to find the corresponding translation function between the proposed software version 25 running on the new master/old standby NCE 14 and the previous software version 20 running on the new standby/old master NCE 12. Using this translation function, the new master/old standby NCE 14 converts (step 110) the data to a format appropriate for the old software version 20 before sending the data to the new standby/old master NCE 12. Examples of events that can require database synchronization include SNMP Set operations that change the administrative state of specific NCE objects. In such instances, a data structure being affected by a set operation may have added or removed members from one software version to the next, and, thus, may need to be processed accordingly through the translation function logic. The new standby/old master NCE 12 stores the data to synchronize the databases. At step 114, the results of the validation determine whether the NCEs 12, 14 adopt the proposed software version 25 (FIG. 5B) or roll back to the previous software version 20 (FIG. 5C).

Figure 5B:
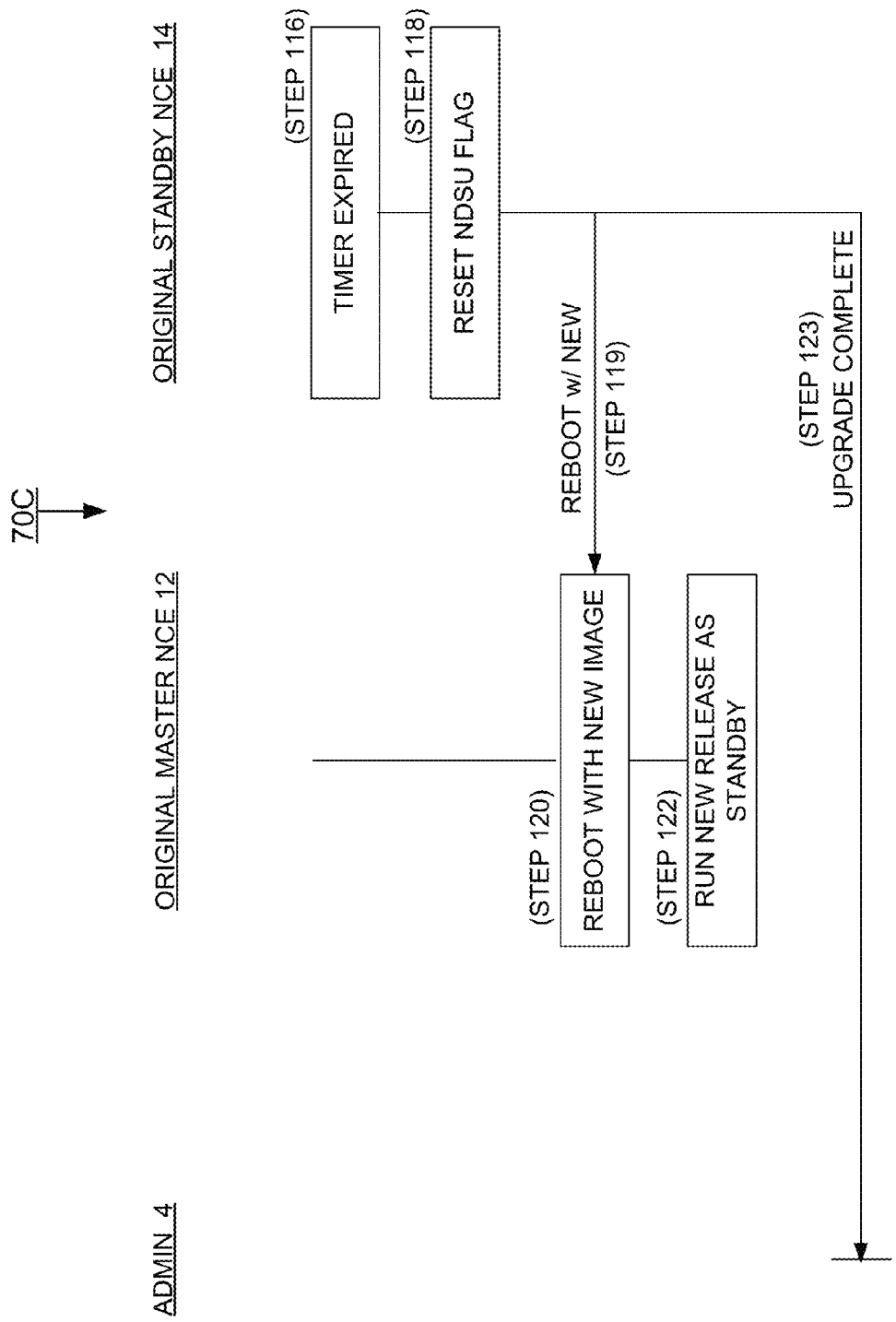
FIG. 5B is a flow chart of an embodiment of a process by which the new master NCE and old master NCE complete the software update upon successful validation of the proposed software version.

FIG. 5B shows an embodiment of a process 70C by which the new master/old standby NCE 14 and old master/new standby NCE 12 complete the software update upon successful validation of the proposed software version. During the validation period, the new master/old standby NCE 14 processes control and data packets in accordance with the proposed software version. After the timer expires (step 116), the new master/old standby NCE 14 resets its configuration settings to reflect normal release rules; specifically, the new master/old standby NCE 14 resets (step 118) the NDSU flag, signifying to itself that the update process is over. The new master/old standby NCE 14 then sends (step 119) a command to the new standby/old master NCE 12 to reboot with the new software image 25.

In response, the new standby/old master NCE 12 resets (step 120) itself and reboots (step 122) running the new software image 25 in the standby role, with the databases of the new standby/old master NCE 12 and new master/old standby NCE 14 in sync (steps 110, 112 of FIG. 5A) and updated to the new data structures of the proposed software version 25. To achieve this synchronization of databases, after running the new software image 25, the new standby/old master NCE 12 goes through steps 94 and 96 (FIG. 3) to perform a bulk sync with the new master/old standby NCE 14; thereafter, the new standby/old master NCE 12 continues to receive incremental syncs from the new master/old standby NCE 14 because both NCEs 12, 14 are running the same software version. This completes the software update process, and the new master/old standby NCE 14 notifies (step 123) the administrator 4 of the results. The NCEs have thus updated to the proposed software version 25 without disrupting the traffic that they are processing.

Figure 5C:
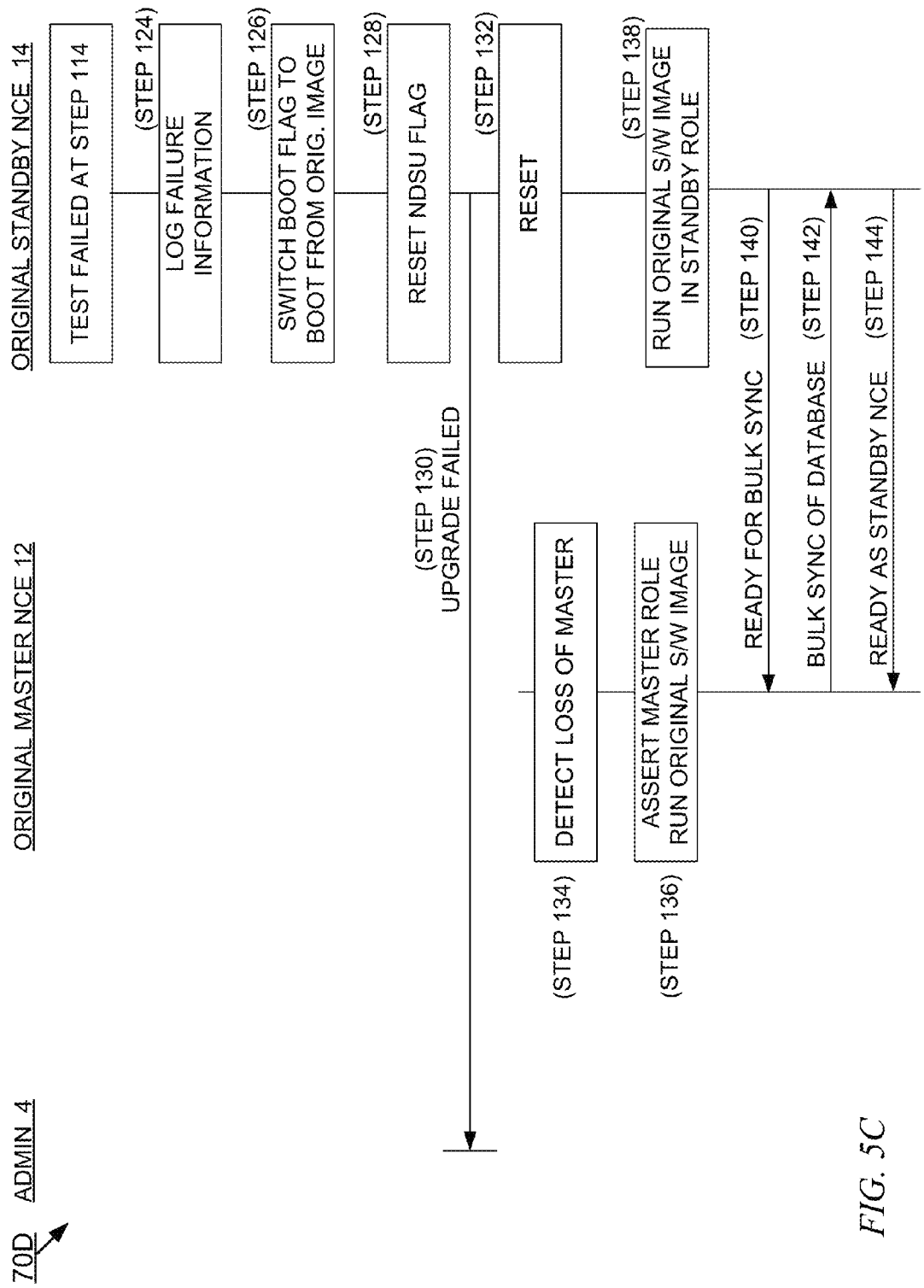
FIG. 5C is a flow chart of an embodiment of a process by which the new master NCE and old master NCE roll back to the old software version upon an unsuccessful validation of the proposed software version.

FIG. 5C shows an embodiment of a process 70D by which the new master/old standby NCE 14 and old master/new standby NCE 12 roll back to the old software version 20 upon an unsuccessful validation (step 114) of the proposed software version. Rollback is possible because old software version 20 continues to run on the old master/new standby NCE 12, and the old master/new standby NCE 12 maintains its database with the data structures of the previous software version 20.

At step 124, the new master/old standby NCE 14 logs failure information. In addition, the new master/old standby NCE 14 switches (step 126) the boot flag to boot from the old software image 20 and resets (step 128) the software update flag, thereby indicating that the NDSU process is no longer in progress. The new master/old standby NCE 14 sends (step 130) a message to the administrator 4, reporting that the update failed.

In addition, the new master/old standby NCE 14 resets (step 132) and reboots. While the new master NCE 14 resets and reboots, the new standby/old master NCE 12 detects (step 134) the loss of a master NCE in the group and asserts (step 136) the master role. In the master role, the restored-to-master NCE 12 runs the previous software image 20, and reassumes control of the processing of control and data traffic for the NCEs 12, 14. Automatic rollback thus does not disrupt the handling of traffic by the NCEs because the master NCE 12 takes over control after the standby NCE 14 relinquishes the master role by resetting. When the new master/old standby NCE 14 reboots, it detects a master (i.e., the restored-to-master NCE 12), and enters (step 138) the standby role. In response to the changed boot flag, the returned-to-standby NCE 14 boots up from and subsequently runs the previous software image 20.

The returned-to-standby NCE 14 sends (step 140) a message to the restored-to-master NCE 12 indicating that the returned-to-standby NCE 14 is ready for a bulk synchronization of the databases (involving the old data structures). In response, the master NCE 12 performs (step 142) a bulk synchronization of databases with the standby NCE 14. Upon completion of the bulk synchronization, the standby NCE 14 reports (step 144) to the master NCE 12 that it is ready as a standby NCE. Automatic rollback thus completes.

During the course of an update, the databases of the NCEs 12, 14 are synchronized. When the NCEs are running different versions of software, the data typically need converting from the data structures of one software version to the data structures of the other software version. Preferably, the NCE with a "newer" software image performs the data conversion, regardless of whether that NCE is operating in the master or in the standby role. In this context, a "newer" software image has a higher version number than an older software image (i.e., upgrades are newer than downgrades). For example, in the upgrade case, the NCE receiving a database sync is in the standby role and runs a newer software version, and thus runs the translation logic 24 to convert messages received from the other NCE. Whereas in the downgrade case, the NCE sending the database sync is in the master role and has the newer software version, and thus runs the translation logic 24 before sending the data/message to the other NCE.

Figure 6:
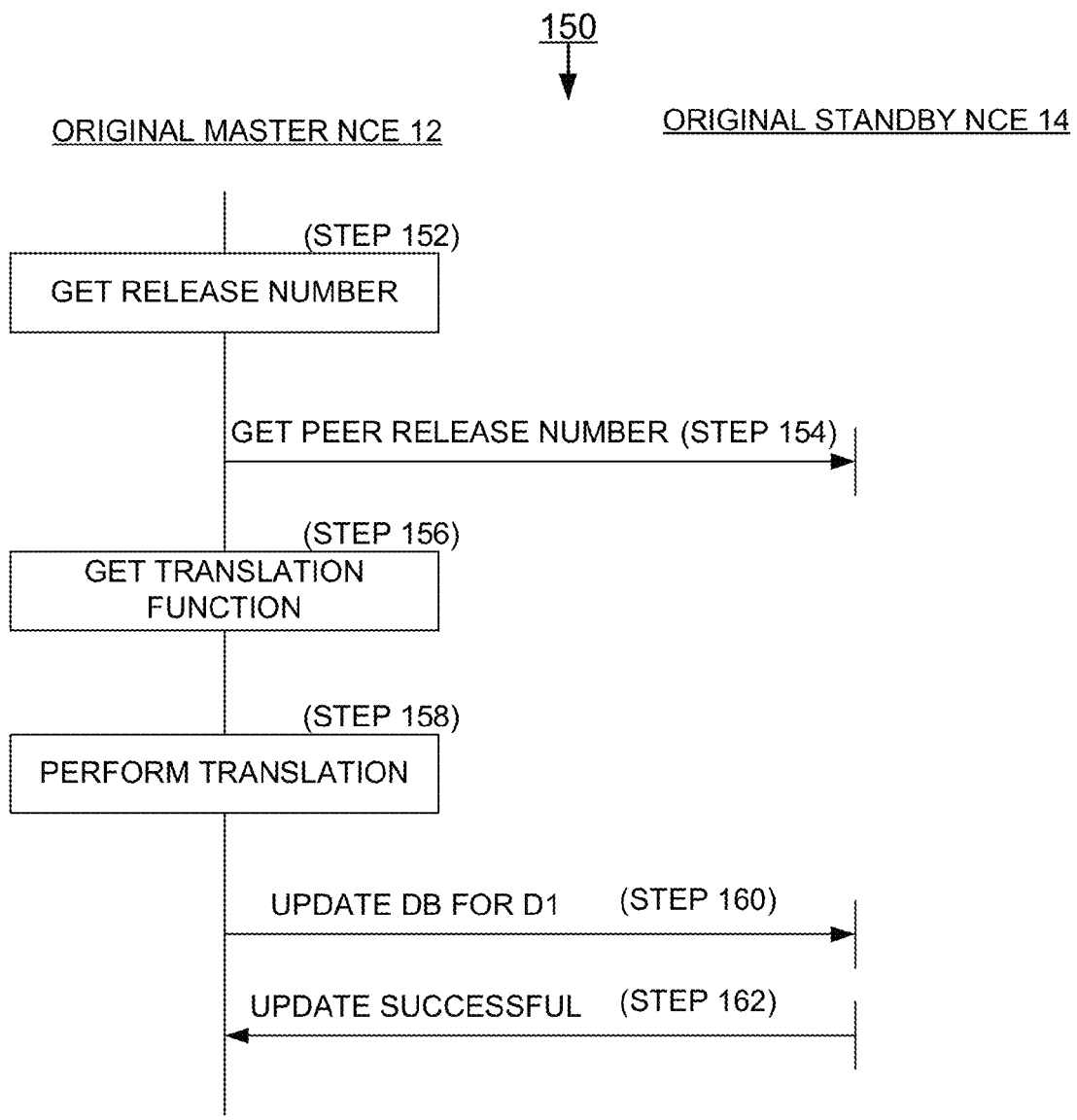
FIG. 6 is a flow chart of an embodiment of a process for performing a data translation wherein the master NCE has a newer software image than the standby NCE, and performs the translating.

FIG. 6 shows an embodiment of a process 150 for performing a data translation where, for example, the master NCE 12 has a newer software image than the standby NCE 14 (i.e., a downgrade instance), and thus performs the translating of the data. At step 152, the master NCE 12 gets the release number of the software image that it is running. The master NCE 12 communicates (step 154) with the standby NCE 14 to get the release number of the software image running at the standby NCE 14. With the two release numbers, the master NCE 12 accesses (step 156) a translation database 24 to obtain the function that converts data from the proposed software release to the old software release. With the acquired function, the master NCE 12 performs (step 158) the translation on data (D1) and sends (step 160) the translated data, in old software release format, to the standby NCE 14. In response to adding the data (D1) to the database, the standby NCE 14 reports (step 162) that the update is successful to the master NCE 12.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit entities, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, entities, and/or components, but do not preclude the presence or addition of one or more other features, integers, steps, operations, entities, components, and/or groups thereof.

The corresponding structures, materials, acts, and equivalents of all means or step plus function entities in the claims below are intended to include any structure, material, or act for performing the function in combination with other claimed entities as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A computer program product for updating software on first and second network controller entities (NCEs) without disrupting traffic processed by the first and second NCEs, the computer program product comprising:
    a computer-readable storage medium having computer-readable program code embodied therewith, the computer-readable program code comprising:
        computer-readable program code configured to transmit a proposed software version, from the first NCE running a current software version in a master role, to the second NCE running the current software version in a standby role;
        computer-readable program code configured to reset the second NCE after receiving the proposed software version from the first NCE such that the second NCE begins running the proposed software version in the standby role;
        computer-readable program code configured to synchronize databases of the first and second NCEs while the second NCE runs the proposed software version in the standby role;
        computer-readable program code configured to reset the first NCE such that the second NCE runs the proposed software version in the master role and the first NCE assumes the standby role while continuing to run the current software version;
        computer-readable program code configured to test, by the second NCE in the master role, live operation of the proposed software version for a predetermined validation period; and
        computer-readable program code configured to send, if validation is successful, a command from the second NCE to the first NCE instructing the first NCE to reboot and run the proposed software version in the standby role, and otherwise, if validation is unsuccessful, to reboot the second NCE automatically such that the second NCE reverts to running the current software version in the standby role and the first NCE reverts to the master role and continues to run the current software version,
        wherein the first NCE and the second NCE are discrete entities such that no hardware resources are transferred between the first NCE and the second NCE while the software is updated on the first NCE and the second NCE, and wherein after the first NCE is rebooted to run the proposed software version in the standby role, the first NCE remains in existence.

2. The computer program product of claim 1, further comprising computer-readable program code configured to perform, at the first NCE, a compatibility check between the proposed software version and the current software version before sending the proposed software version to the second NCE.

3. The computer program product of claim 1, wherein the computer-readable program code configured to synchronize the databases of the first and second NCEs while the second NCE runs the proposed software version in the standby role comprises:
    computer-readable program code configured to transmit data from the database of the first NCE to the second NCE; and
    computer-readable program code configured to translate the transmitted data from the format compatible to the current software version to the format compatible to the proposed software version.

4. The computer program product of claim 3, wherein the second NCE executes the computer-readable program code configured to translate the transmitted data if the proposed software version is an upgrade version of the current software version, and wherein the first NCE executes the computer-readable program code configured to translate the transmitted data if the proposed software version is a downgrade of the current software version.

5. The computer program product of claim 3, further comprising computer-readable program code configured to synchronize the databases of the first and second NCEs while the second NCE runs the proposed software version in the master role.

6. The computer program product of claim 5, wherein the computer-readable program code configured to synchronize the databases of the first and second NCEs while the second NCE runs the proposed software version in the master role comprises:
    computer-readable program code configured to transmit data from the database of the second NCE to the first NCE; and
    computer-readable program code configured to translate the transmitted data from the format compatible to the proposed software version to the format compatible to the current software version.

7. The computer program product of claim 6, wherein the second NCE executes the computer-readable program code configured to translate if the proposed software version is an upgrade version of the current software version, and wherein the first NCE executes the computer-readable program code configured to translate if the proposed software version is a downgrade of the current software version.

8. A system comprising:
    a first network controller entity (NCE) running a current software version in a master role;
    a second NCE in communication with the first NCE over a network, the second NCE running a current software version in a standby role;
    wherein the first NCE transmits a proposed software version to the second NCE running the current software version in a standby role, the second NCE resets after receiving the proposed software version from the first NCE such that the second NCE begins running the proposed software version in the standby role, the first and second NCEs synchronizing databases while the second NCE runs the proposed software version in the standby role, the first NCE resetting so that the second NCE runs the proposed software version in master role and the first NCE assumes the standby role while continuing to run the current software version, the second NCE testing, while in the master role, live operation of the proposed software version for a predetermined validation period, wherein, if validation is successful, the second NCE sends a command to the first NCE, instructing the first NCE to reboot and run the proposed software version in the standby role, and otherwise, if validation is unsuccessful, the second NCE automatically reboots such that the second NCE reverts to running the current software version in the standby role and the first NCE reverts to the master role and continues to run the current software version, and wherein the first NCE and the second NCE are discrete hardware entities such that no hardware resources are transferred between the first NCE and the second NCE while the software is updated on the first NCE and the second NCE, and wherein after the first NCE is rebooted to run the proposed software version in the standby role, the first NCE remains in existence.

9. The system of claim 8, further comprising wherein the first NCE performs a compatibility check between the proposed software version and the current software version before sending the proposed software version to the second NCE.

10. The system of claim 8, wherein the first and second NCEs synchronize their databases while the second NCE runs the proposed software version in the standby role by:

transmitting data from the database of the first NCE to the second NCE; and translating the transmitted data from the format compatible to the current software version to the format compatible to the proposed software version.

11. The system of claim 10, wherein the second NCE performs the translating if the proposed software version is an upgrade version of the current software version, and wherein the first NCE performs the translating if the proposed software version is a downgrade of the current software version.

12. The system of claim 8, wherein the first and second NCEs further synchronize their databases while the second NCE runs the proposed software version in the master role.

13. The system of claim 12, wherein the first and second NCEs synchronize their databases while the second NCE runs the proposed software version in the master role by:

transmitting data from the database of the second NCE to the first NCE; and translating the transmitted data from the format compatible to the proposed software version to the format compatible to the current software version.

14. The system of claim 13, wherein the second NCE performs the translating if the proposed software version is an upgrade version of the current software version, and wherein the first NCE performs the translating if the proposed software version is a downgrade of the current software version.

* * * * *